(12) United States Patent
Takagi

(10) Patent No.: US 9,174,615 B2
(45) Date of Patent: Nov. 3, 2015

(54) DRIVE SUPPORT APPARATUS

(71) Applicant: Toshihiro Takagi, Nissin (JP)

(72) Inventor: Toshihiro Takagi, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/486,299

(22) Filed: Sep. 15, 2014

(65) Prior Publication Data

US 2015/0112566 A1   Apr. 23, 2015

(30) Foreign Application Priority Data

Oct. 23, 2013   (JP) ................. 2013-220190

(51) Int. Cl.

| G06F 7/70 | (2006.01) |
|---|---|
| G06F 19/00 | (2011.01) |
| G06G 7/00 | (2006.01) |
| G06G 7/76 | (2006.01) |
| B60T 7/22 | (2006.01) |
| G01S 15/08 | (2006.01) |
| G01S 15/93 | (2006.01) |
| G01S 15/46 | (2006.01) |
| G01S 15/87 | (2006.01) |
| B60T 7/12 | (2006.01) |
| G05D 1/00 | (2006.01) |
| B60Q 1/00 | (2006.01) |

(52) U.S. Cl.
CPC . *B60T 7/22* (2013.01); *G01S 15/08* (2013.01); *G01S 15/46* (2013.01); *G01S 15/876* (2013.01); *G01S 15/931* (2013.01); *B60T 2201/022* (2013.01)

(58) Field of Classification Search
CPC ............... G01S 15/166; G01S 15/931; G01S 2013/9346; G08G 1/16; B60Q 5/006; B60Q 9/006; B60K 3/0008
USPC .......... 701/96, 70; 367/99; 382/157; 340/435
See application file for complete search history.

(56) References Cited

U.S. PATENT DOCUMENTS

| 6,294,986 B1 * | 9/2001 | Landsiedel ................. 340/435 |
|---|---|---|
| 2003/0233187 A1 * | 12/2003 | Egami ............................ 701/96 |
| 2007/0206849 A1 * | 9/2007 | Sakata et al. ............... 382/157 |
| 2007/0291590 A1 * | 12/2007 | Harada et al. ................. 367/99 |
| 2012/0179350 A1 * | 7/2012 | Taneyhill et al. .............. 701/96 |

FOREIGN PATENT DOCUMENTS

| JP | 2004-280489 A | 10/2004 |
|---|---|---|
| JP | 2005-56336 | 3/2005 |
| JP | 2007-333609 | 12/2007 |

(Continued)

*Primary Examiner* — Helal A Algahaim
*Assistant Examiner* — Mahmoud Ismail
(74) *Attorney, Agent, or Firm* — Oblon, McClelland, Maier & Neustadt, L.L.P.

(57) ABSTRACT

A drive support apparatus is disclosed, which includes a sonar sensor that transmits an ultrasonic wave to an object outside of a vehicle to obtain, based on a reflected wave thereof, object information related to a distance to the object; a controller that permits a first drive force limitation control when the distance to the object is longer than or equal to a predetermined distance, and permits at least one of a second drive force limitation control and an intervention brake control when the distance to the object is shorter than the predetermined distance, wherein a limitation level in the second drive force limitation control is higher than that in the first drive force limitation control.

5 Claims, 8 Drawing Sheets

(56) References Cited

FOREIGN PATENT DOCUMENTS

| | | |
|---|---|---|
| JP | 2009-154590 A | 7/2009 |
| JP | 2010-257298 A | 11/2010 |
| JP | 2010-260504 | 11/2010 |
| WO | 2011/128940 A1 | 10/2011 |
| WO | 2012/152896 A1 | 11/2012 |

* cited by examiner

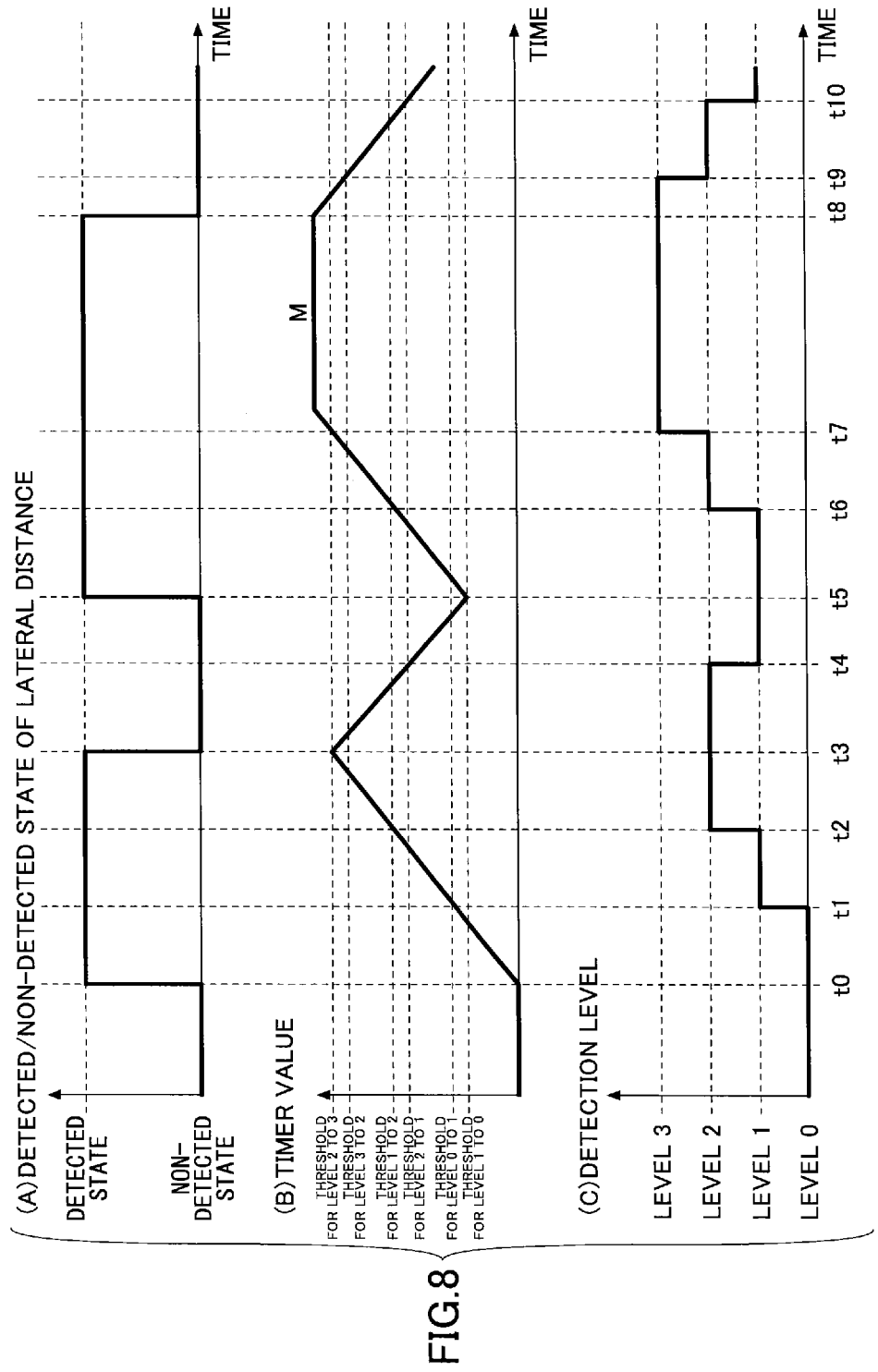

DRIVE SUPPORT APPARATUS

FIELD

The disclosure is related to a drive support apparatus.

BACKGROUND

An obstacle detection apparatus is known from Patent Publication No. 2007-333609. The known obstacle detection apparatus compares a signal of a received wave of a sonar sensor, which is amplified by a predetermined gain, with a threshold for determining the presence or absence of an obstacle.

In general, a sonar sensor has a shorter sensing distance than a radar sensor which uses an electromagnetic wave (millimeter wave, for example) or a light wave (laser, for example). It is useful to enlarge the sensing distance of the sonar sensor in order to appropriately perform an intervention brake control (or a drive force limitation control) based on object information from the sonar sensor. However, if the sensing distance of the sonar sensor is enlarged, a detection area thereof is enlarged accordingly, which means that a non-target object, which is not a target to be detected and is not detected otherwise, may be detected.

SUMMARY

According to one aspect of the disclosure, a drive support apparatus is provided, which includes:
a sonar sensor that transmits an ultrasonic wave to an object outside of a vehicle to obtain, based on a reflected wave thereof, object information related to a distance to the object;
a controller that permits a first drive force limitation control when the distance to the object is longer than or equal to a predetermined distance, and permits at least one of a second drive force limitation control and an intervention brake control when the distance to the object is shorter than the predetermined distance, wherein a limitation level in the second drive force limitation control is higher than that in the first drive force limitation control.

BRIEF DESCRIPTION OF DRAWINGS

FIG. 8 is diagram for explaining an example of a way of calculating a detection level of the lateral distance of an object.

DESCRIPTION OF EMBODIMENTS

In the following, embodiments are described in detail with reference to appended drawings.

Figure 1:
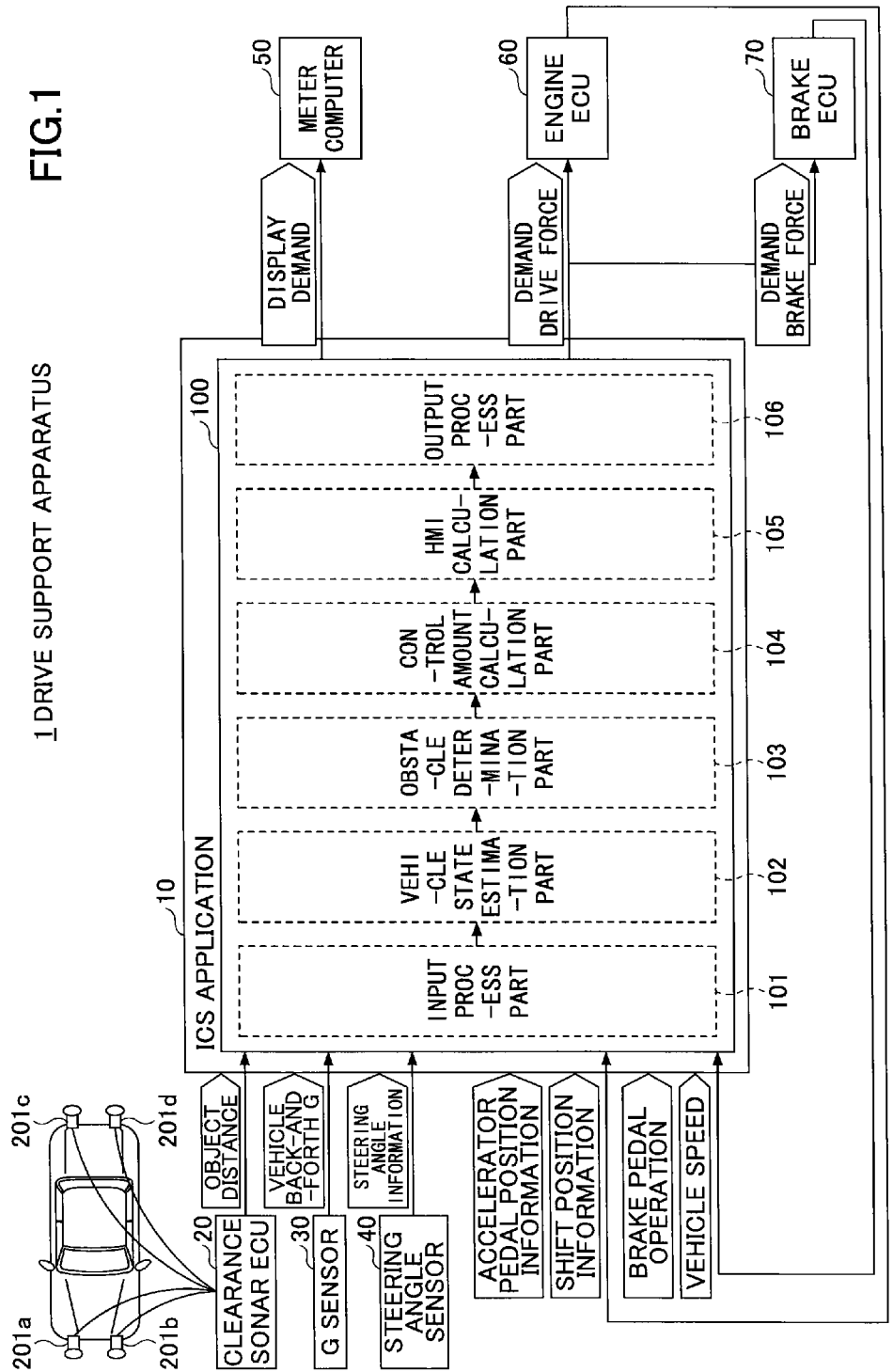
FIG. 1 is a block diagram for illustrating an example of a system configuration of a drive support apparatus 1 according to an embodiment.

FIG. 1 is a block diagram for illustrating an example of a system configuration of a drive support apparatus 1 according to an embodiment.

In FIG. 1, the drive support apparatus 1 includes a drive support ECU 10. The drive support ECU 10 includes a microprocessor that includes a CPU, a ROM in which control programs are stored, a RAM in which calculation results are stored, a timer, a counter, an input interface, an output interface, etc., for example.

The function of the drive support ECU 10 may be implemented by any hardware, software, firmware, or any combination thereof. For example, any part of or all of functions of the drive support ECU 10 may be implemented by an ASIC (application-specific Integrated Circuit), a FPGA (Field Programmable Gate Array), etc. Further, any part of or all of the functions of the drive support ECU 10 may be implemented by another ECU (a clearance sonar ECU 20, for example). Further, the drive support ECU 10 may implement any part of or all of functions of another ECU (the clearance sonar ECU 20, for example).

The drive support ECU 10 may be connected to the clearance sonar ECU 20, clearance sonars 201a, 201b, 201c and 201d, an acceleration sensor (referred to as a "G sensor", hereinafter) 30, a steering sensor 40, a meter computer 50, an engine ECU 60, a brake ECU 70, etc. For example, the drive support ECU 10 may be connected to the clearance sonar ECU 20, the G sensor 30, the steering sensor 40, the meter computer 50, the engine ECU 60 and the brake ECU 70 with a CAN (Controller Area Network) or a direct wire such that the drive support ECU 10 can communicate with the clearance sonar ECU 20, the G sensor 30, the steering sensor 40, the meter computer 50, the engine ECU 60 and the brake ECU 70.

The clearance sonars 201a, 201b, 201c and 201d are sonar sensors that are provided at appropriate locations in a vehicle body. The clearance sonars 201a, 201b, 201c and 201d are each examples of a sonar sensor that detects the presence or absence of an object with a detection distance from a few centimeters to a few meters or detects a distance to the object. In the illustrated example, two clearance sonars 201a and 201b are provided in a front bumper and two clearance sonars 201c and 201d are provided in a rear bumper. However, the number of the sensors and the arrangement thereof are not limited to those illustrated in the drawing. For example, four sonar sensors may be provided in the front and rear portions, respectively, and two sonar sensors may be provided in side portions. The clearance sonars 201a, 201b, 201c and 201d each output detection results (i.e., object information) within corresponding detection ranges to the clearance sonar ECU 20.

The clearance sonars 201a, 201b, 201c and 201d may be operated in a low-vehicle speed region whose lower limit is greater than 0. Further, the clearance sonars 201a and 201b for the forward object detection may be operated during the travel with a drive shift range (D range, for example) for driving in the forward direction, and clearance sonars 201c and 201b for the back object detection may be operated during the travel with a reverse shift range for driving in the backward direction.

The clearance sonar ECU 20 processes the detection result input from the clearance sonars 201a, 201b, 201c and 201d to calculate the distance to the object (also referred to as a "object distance"). The clearance sonar ECU 20 transmits information of the calculated object distance (distance information) to the drive support ECU 10. For example, the clearance sonar ECU 20 may measure the object distance by measuring a time from a transmission of an ultrasonic wave from the clearance sonar to a reception of a reflected wave thereof that is reflected at the object. It is noted that, in the case where the detection angle of the clearance sonar is wide, with only the detection result of a single clearance sonar the direction of the object cannot be identified. However, the clearance sonar ECU 20 may identify a lateral distance of the object (with respect to the traveling direction of the host vehicle) based on the object distances obtained from a plurality of the clearance sonars, or may determine a shape of the object (such as a shape of a wall, a shape of a power pole, for example). A way of identifying (calculating) the lateral distance is arbitrary, and may be based on a triangulation (see FIG. 7), for example.

The G sensor 30 measures the acceleration of the vehicle in a longitudinal direction of the vehicle, and transmits the measurement result as information of "vehicle back-and-forth G" to the drive support ECU 10. The acceleration of the vehicle in the longitudinal direction of the vehicle is a sum of the acceleration measured from vehicle wheel speeds and gravity due to a slope of a road (i.e., the gradient of the vehicle). Thus, the slope of the road may be measured by subtracting the acceleration measured from vehicle wheel speeds from the vehicle back-and-forth G measured by the G sensor 30.

The steering sensor 40 detects a steering angle of a steering wheel, and transmits steering information to the drive support ECU 10.

The meter computer 50 is connected to a combination meter apparatus (not illustrated) for outputting visual information to the driver and an alarm apparatus (not illustrated) for outputting an alarm to the driver. The meter computer 50 controls a numeral, a text, a figure, an indicator, etc., displayed in the combination meter apparatus, and controls sound or speech of the alarm output by the alarm apparatus.

The engine ECU 60 controls operations of an engine that is a drive source of the vehicle. For example, the engine ECU 60 controls ignition timing, a fuel injection amount, etc. The engine ECU 60 controls an output of the engine based on a demand drive force from the drive support ECU 10 described hereinafter. It is noted that, in the case of a hybrid vehicle, the engine ECU 60 may control (suppress), in cooperation with a hybrid ECU that controls a hybrid system, the drive force according to the demand drive force from the drive support ECU 10. It is noted that, in the case of the hybrid vehicle or an electric vehicle, an output of the motor may be controlled based on the demand drive force from the drive support ECU 10.

Further, the engine ECU 60 may transmit information of an accelerator pedal position and information of a shift position. The information of the accelerator pedal position represents the operation amount of the accelerator pedal (not illustrated). The information of the shift position represents a position of a shift lever such as P (parking), R (reverse), N (neutral), D (drive), etc. It is noted that the information of the accelerator pedal position may be directly obtained from an accelerator position sensor. Further, the information of the shift position may be obtained from an ECU that controls a transmission, or directly obtained from a shift position sensor.

The brake ECU 70 controls a brake apparatus of the vehicle. For example, the brake ECU 70 controls a brake actuator that generates and supplies high-pressure oil to wheel cylinders (not illustrated). The brake ECU 70 controls an output of the brake actuator (wheel cylinder pressures) based on a demand brake force from the drive support ECU 10 described hereinafter. It is noted that the brake actuator may include a pump (and a motor that drives the pump) that generates high-pressure oil, valves, etc. Further, a configuration of an oil hydraulic circuit of the brake apparatus is arbitrary. The oil hydraulic circuit of the brake apparatus can increase the wheel cylinder pressures regardless of a brake pedal operation amount by the driver. Typically, the oil hydraulic circuit of the brake apparatus may include a high-pressure source (a pump for generating the high-pressure oil and a an accumulator, for example) other than a master cylinder. Further, such an oil hydraulic circuit that is typically used in a brake-by-wire system such as an ECB (Electric Control Braking system) may be adapted. Further, in the case of the hybrid vehicle or an electric vehicle, the output of the motor (regeneration operation) may be controlled based on the demand brake force from the drive support ECU 10.

Further, the engine ECU 70 may transmit information of a brake pedal operation and information of wheel speeds. The information of wheel speeds may be based on signals from vehicle speed sensors of the respective vehicle wheels (not illustrated), for example. It is noted that the speed of the vehicle (vehicle body speed) and the acceleration/deceleration can be calculated from the information of the wheel speeds. It is noted that the information of the brake pedal operation may be directly obtained from a brake pedal sensor or a master cylinder pressure sensor, and the information of the wheel speeds (or the information of the vehicle speed) may be directly obtained from the vehicle speed sensors and a drive shaft rotation sensor.

The drive support ECU 10 includes an ICS (Intelligent Clearance Sonar) application 100. In the illustrated example, the ICS application 100 is a software resource executed in the drive support ECU 10, and includes an input process part 101, a vehicle state estimation part 102, an obstacle determination part 103, a control amount calculation part 104, a HMI (Human Machine Interface) calculation part 105 and an output process part 106.

The drive support ECU 10 performs the drive support based on the information from the clearance sonar ECU 20, etc., such that the host vehicle does not crash into an obstacle which is a target be detected. The drive support may include outputting (in cooperation with the meter computer 50) an alarm for urging the driver to voluntarily perform the brake operation, suppressing (in cooperation with the engine ECU 60) the drive force with the intervention, and suppressing (in cooperation with the brake ECU 70) the brake force with the intervention. Suppressing the drive force may be implemented in any manner. For example, suppressing the drive force may be implemented by limiting the fuel injection amount, limiting a throttle position (closing a throttle valve, for example), etc.

The input process part 101 processes the input information received by the drive support ECU 10. For example, the input process part 101 converts the information received by a CAN communication protocol into information that can be used by the ICS application 100. The distance information from the clearance sonar ECU 20, the information of the vehicle back-and-forth G from the G sensor 30, the steering angle information from the steering sensor 40, etc., may be input to the input process part 101. Further, the information of the accelerator pedal position and the information of the shift position from the engine ECU 60 is input to the input process part 101, and the information of the brake pedal operation and the information of the vehicle wheel speeds from the brake ECU 70 is input to the input process part 101.

The vehicle state estimation part 102 estimates a vehicle state based on various information items input to the vehicle state estimation part 102 as described above. For example, the vehicle state estimation part 102 determines whether the vehicle state in which the clearance sonars 201a, 201b, 201c and 201d are to be operated is formed.

The obstacle determination part 103 determines (performs an obstacle determination) whether the object detected by the clearance sonars 201a, 201b, 201c and 201d is the obstacle to be detected, based on the object distances received from the clearance sonar ECU 20. This is because there may be a case where the object information detected by the clearance sonars 201a, 201b, 201c and 201d is generated due to noise, an existence of an object (inclined walls on opposite sides of a road described hereinafter, for example) which cannot be an obstacle, etc. It is noted that the obstacle determination may be performed independently for the object information items related to the corresponding clearance sonars 201a, 201b, 201c and 201d. Alternatively, for example, with respect to the object in front of the vehicle, the obstacle determination may be performed using the object information items related to the clearance sonars 201a and 201b for the forward object detection. A concrete example of the obstacle determination way by the obstacle determination part 103 is described hereinafter.

The control amount calculation part 104 calculates a control amount of the drive support based on the information from the obstacle determination part 103. At that time, the control amount calculation part 104 changes a way of the drive support based on the information (determination result) from the obstacle determination part 103. A concrete way of the drive support is described hereinafter.

The HMI calculation part 105 performs calculations for outputting various information items for inducing the attention of the driver to the obstacle, when the obstacle to be detected is detected. For example, the HMI calculation part 105 performs calculations for transmitting information to the driver with a display apparatus, an audio apparatus, a vibration apparatus, etc. (not illustrated) via the meter computer 50.

The output process part 106 converts the control amounts (the demand driver force and the demand brake force) calculated by the control amount calculation part 104 and the calculation results (the output information) of the HMI calculation part 105 into signals complying with the CAN communication protocol, for example, for transmitting them to the engine ECU 60, the brake ECU 70 and the meter computer 50.

Figure 2:
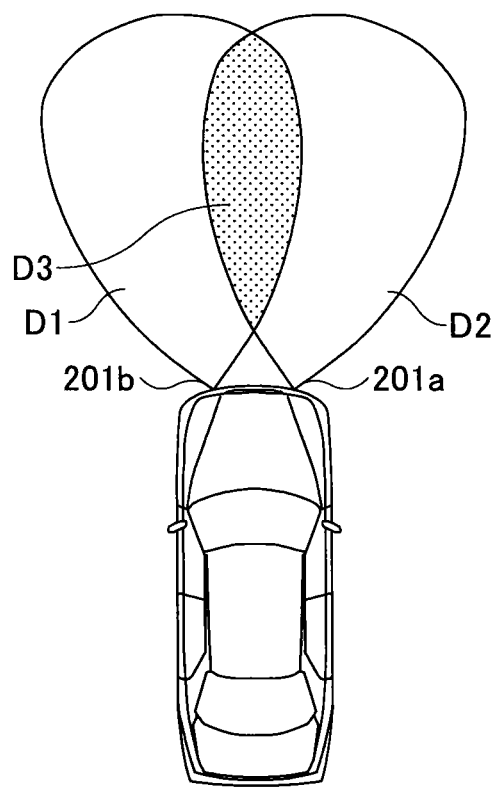
FIG. 2 is a diagram for schematically illustrating detection areas of left and right clearance sonars 201a and 201b for detecting a forward object.

FIG. 2 is a diagram for schematically illustrating detection areas of the left and right clearance sonars 201a and 201b for the forward object detection.

In the example illustrated in FIG. 2, the left and right clearance sonars 201a and 201b have the corresponding detection areas D1 and D2, respectively. The detection areas D1 and D2 may be symmetrical with respect to a back-and-forth center axis of the vehicle. Preferably, the detection areas D1 and D2 include an overlapped area D3 in a frontal direction of the vehicle, as illustrated in FIG. 2. In this case, as described hereinafter, it is possible to calculate the lateral distance of the object from the distance information based on the detection results of the left and right clearance sonars 201a and 201b. It is noted that the lateral width of the overlapped area D3 may be smaller than the width of the vehicle.

Figure 3:
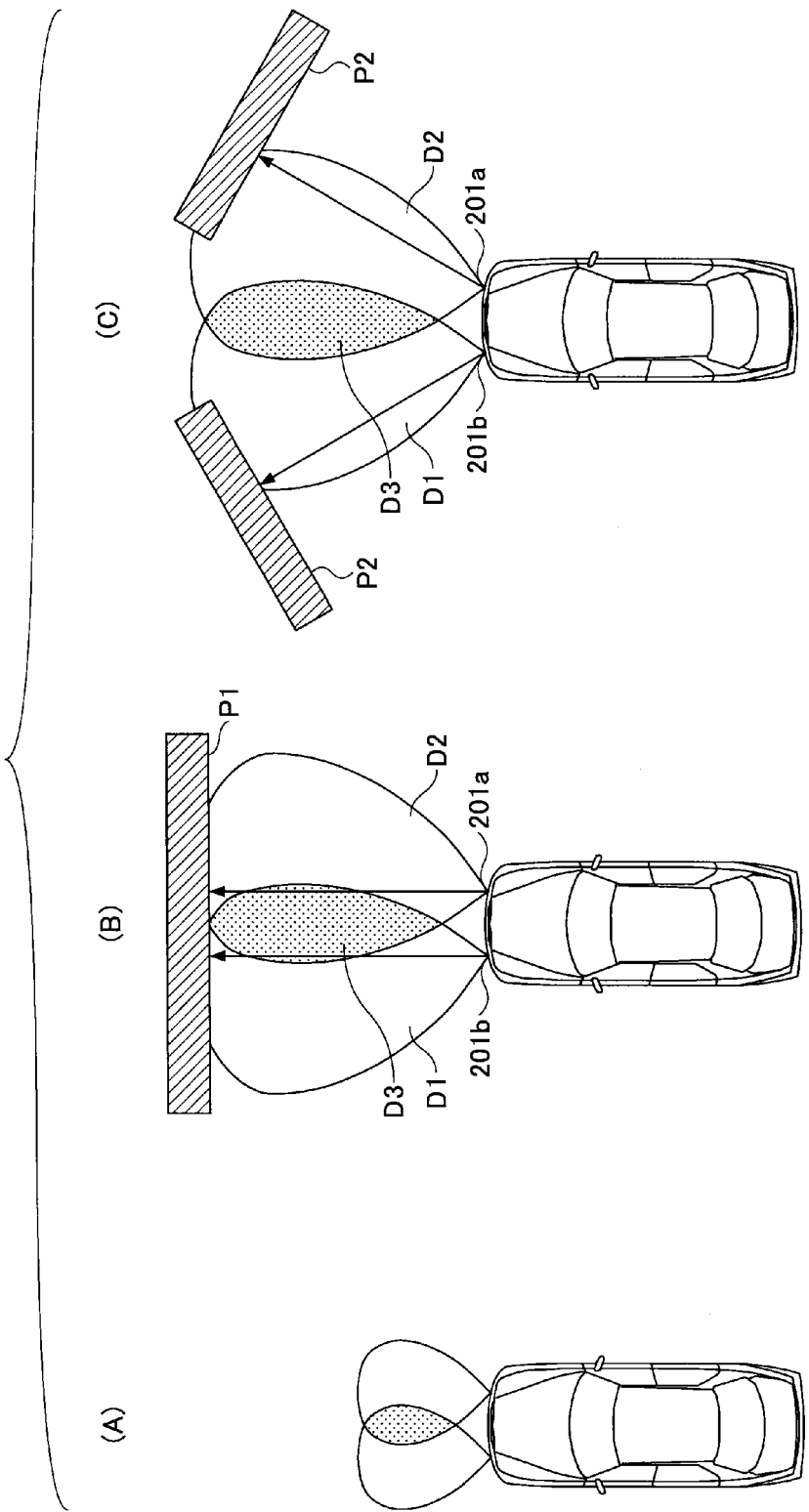
FIG. 3 is a diagram for explaining an enlargement of the detection areas (sensing distances) of the left and right clearance sonars 201a and 201b for detecting a forward object.

FIG. 3 is a diagram for explaining an enlargement of the detection areas (sensing distances) of the left and right clearance sonars 201a and 201b for the forward object detection. In FIG. 3, (A) illustrates a case where the sensing distances are relatively short, while (B) and (C) illustrate a case where the sensing distances are relatively long (i.e., the sensing distances are enlarged).

Preferably, the sensing distances of the left and right clearance sonars 201a and 201b are relatively long (greater than or equal to 3.5 m, for example, and preferably, greater than or equal to 4 m), as illustrated in FIG. 3(B). With this arrangement, in comparison with the example illustrated in FIG. 3(A), the obstacle P1 in the frontal direction of the vehicle can be detected earlier, which enables starting the drive support earlier and thus reducing a likelihood of a crash into the obstacle.

In the example illustrated in FIG. 3(B), side walls (also referred to "inclined walls", hereinafter) P2 exist on the opposite sides in front of the vehicle. The inclined walls are inclined such that the width (between the walls) on the near side for the vehicle is greater than the width on the far side in a plane view. The inclined walls may exist at entrances of bridges, tunnels below highways, etc., for example. The width (in the lateral direction) between the inclined walls P2 is slightly greater than the width of the vehicle and thus the passage therethrough by the vehicle is possible. If the sensing distances are enlarged as illustrated in FIG. 3 (B), such inclined walls P2 as illustrated in FIG. 3 (C), which are not targets to be detected, may be detected.

In the following, such a configuration is mainly described that has the detection areas of the left and right clearance sonars 201a and 201b enlarged while enabling the passage through a narrow road between such inclined walls P2.

Figure 4:
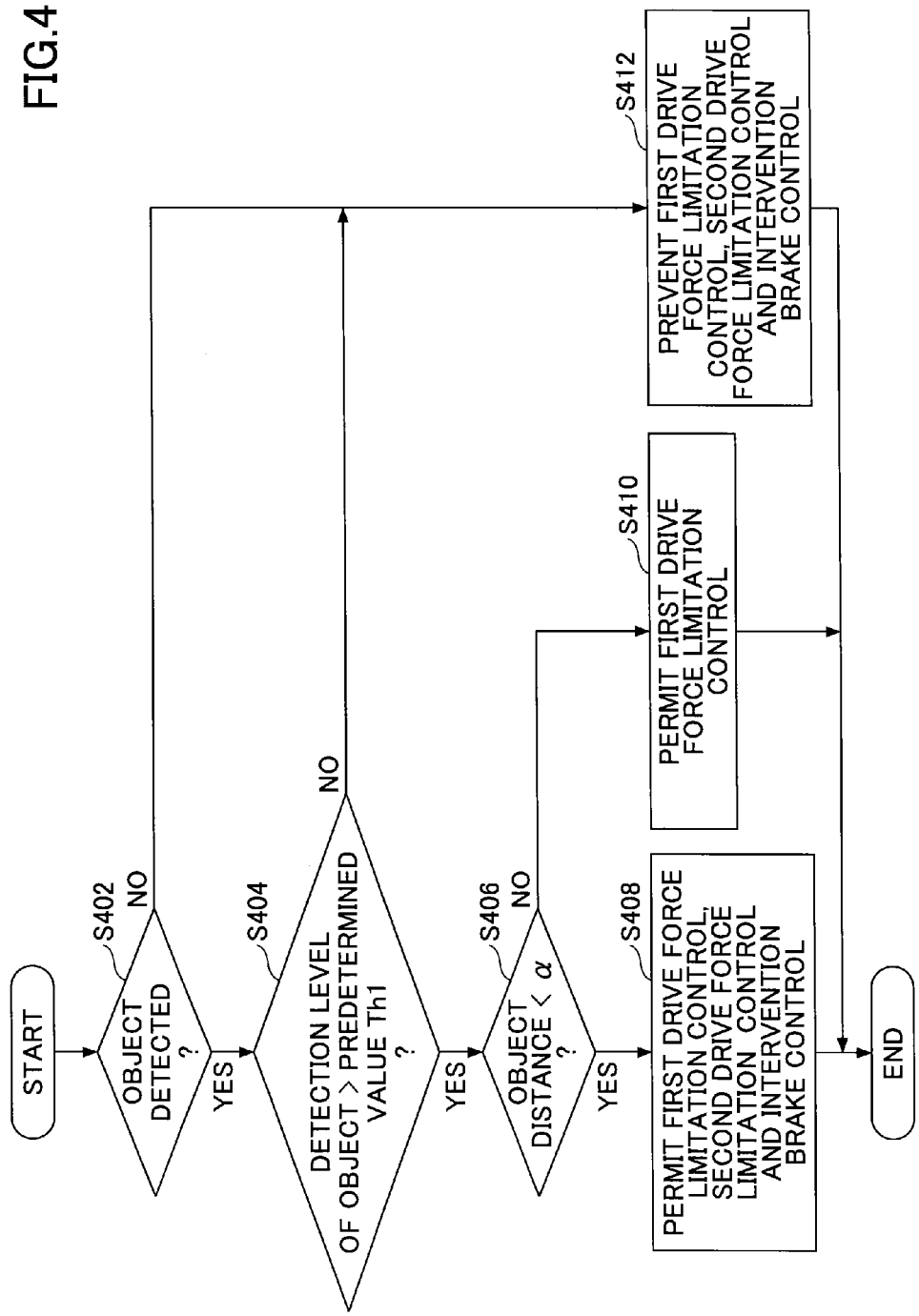
FIG. 4 is an example of a flowchart of a process executed by a drive support ECU 10.

FIG. 4 is an example of a flowchart of a process executed by the drive support ECU 10. The process routine illustrated in FIG. 4 may be executed at a predetermined cycle during the operations of the clearance sonars 201a, 201b, 201c and/or 201d. It is noted that, with respect to the clearance sonars 201a, 201b, 201c and 201d, only the clearance sonars on the forward side in the traveling direction of the vehicle may be operated in the low-vehicle speed region whose lower limit is greater than 0, for example to perform the transmission/reception process of the ultrasonic waves at a predetermined cycle. The process routine illustrated in FIG. 4 may be performed independently for the distance information items related to the corresponding clearance sonars 201a, 201b, 201c and 201d, or collectively for the distance information items related to the corresponding clearance sonars 201a, 201b, 201c and 201d. In the following, as an example, it is assumed that the vehicle travels forward, and a process executed with respect to the distance information of the clearance sonar 201b is explained. The same process with respect to the distance information of the clearance sonar 201b may be executed in parallel.

In step S402, the obstacle determination part 103 determines whether the object is detected based on the distance information (related to the clearance sonar 201b) from the clearance sonar ECU 20. It is noted that, if the object is not detected, the distance information from the clearance sonar ECU 20 is not substantially supplied. It is noted that, if the object was detected at the previous cycle(s), a temporary misdetection of the distance information due to noise, etc., may happen even though the object still exists in the detection area. Thus, even if such a temporary misdetection of the distance information happens, it may be determined that the object is detected. In other words, once the object is detected, it may be determined that the object is detected, until the object is not detected successively for a predetermined number of cycles. If the object is detected, the process routine goes to step S404, and otherwise, the process routine goes to step S412.

In step S404, the obstacle determination part 103 determines whether a detection level of the object is greater than a predetermined value Th1. The threshold Th1 corresponds to a maximum value of a possible range of the detection level due to the noise that is not a target to be detected. The threshold Th1 may be adapted by experiments, simulations, etc. The detection level of the object may corresponds to a level of the reflected wave. Alternatively, the detection level of the object may be an index value that represents a continuity of the detection of the object in time series. In other words, the index value may represent how successively the object is detected by the clearance sonar 201*b* in time series. For example, the index value may be an integrated value of a time during which the object is detected by the clearance sonar 201*b*. For example, if the object is detected for the first time at a certain cycle T0, and afterward the object is still detected in the five successive cycles at the current cycle T4, the index value may be 5T (T is a time of a single cycle). In this case, when the object is not detected temporally at a certain cycle, the index value may be reset to 0, or the time of cycles during which the object is not detected may be subtracted therefrom. Further, the index value may be the number of the cycles during which the object is detected by the clearance sonar 201*b*. For example, if the object is detected for the first time at a certain cycle T0, and afterward the object is still detected in the five successive cycles at the current cycle T4, the index value may be 5. Further, in this case, when the object is not detected temporally at a certain cycle, the index value may be reset to 0, or the number of cycles during which the object is not detected may be subtracted therefrom. It is noted that, in the case where a state in which the object is not detected successively at more than predetermined cycles, it may be regarded that the object becomes in a non-detection state (in this case, the index value becomes 0, and even if the same object is detected again afterward, the object is processed as a new object). Further, in a simple example, the index value may be a binary value which indicates whether the object is detected by the clearance sonar 201*b* successively at more than predetermined cycles.

In step 404, if the detection level is greater than the predetermined value Th1, the process goes to step 406, and otherwise the process goes to step 412.

In step S406, the obstacle determination part 103 determines whether the object distance is smaller than a predetermined distance a based on the distance information (related to the clearance sonar 201*b*) from the clearance sonar ECU 20. It is noted that the predetermined distance a may be smaller than the sensing distance of the clearance sonar 201*b*. An example of a way of setting the predetermined distance a is described hereinafter.

If the object distance is smaller than the predetermined distance a, the process goes to step S408, and otherwise the process goes to step S410.

In step 408, the obstacle determination part 103 permits all of a first drive force limitation control, a second drive force limitation control and an intervention brake control. As a result of this, the first drive force limitation control, the second drive force limitation control and the intervention brake control are executed, if necessary. The first drive force limitation control is such that a limitation level in the first drive force limitation control is lower than that in the second drive force limitation control. For example, the first drive force limitation control may include setting a predetermined first upper limit for the drive force demand calculated according to the accelerator operation by the user. In this case, the second drive force limitation control may include setting a predetermined second upper limit for the drive force demand that is smaller than the predetermined first upper limit. The second upper limit may be 0. In this case, the second drive force limitation control may include fully closing the throttle valve (power cut). The second drive force limitation control may include gradually reducing the throttle valve to the full closed position.

When the intervention brake control is controlled, the control amount calculation part 104 determines whether the detected object (obstacle) is going to be crashed into by the host vehicle (i.e., whether the object is to be prevented by the drive support). For example, the control amount calculation part 104 may determine that the host vehicle is going to crash into the object when the object distance is smaller than a predetermined distance, the vehicle speed is greater than or equal to a predetermined value (or the magnitude of the necessary deceleration is greater than or equal to a predetermined threshold) and the object is located in a region where the steering operation cannot prevent the crash into the object, based on the object information related to the object detected by the clearance sonar 201*b*, the steering information received by the steering sensor 40, the vehicle wheel speed information received by the brake ECU 70, etc. It is noted that the steering information may not be considered. If the control amount calculation part 104 determines that the host vehicle is going to crash into the object, the control amount calculation part 104 calculates the deceleration (target deceleration) required to prevent the crash into the object and calculates the demand brake force according to the target deceleration.

It is noted that the execution of the intervention brake control may involve the execution of the second drive force limitation control (the power cut, for example). At that time, the second drive force limitation control may be executed at the time of starting the execution of the intervention brake control or prior to the execution of the intervention brake control.

In step 410, the obstacle determination part 103 permits only the first drive force limitation control, among the first drive force limitation control, the second drive force limitation control and the intervention brake control. As a result of this, only the first drive force limitation control is executed, if necessary.

In step 412, the obstacle determination part 103 prevents all the first drive force limitation control, the second drive force limitation control and the intervention brake control. In this case, the function of the control amount calculation part 104 may be substantially disabled. It is noted that, if all the first drive force limitation control, the second drive force limitation control and the intervention brake control are already in the prevented state at the time of starting the process at the current cycle, the process at the current cycle ends as it is. Specifically, all the first drive force limitation control, the second drive force limitation control and the intervention brake control are permitted by the process of step S408 at the previous cycle at the time of starting the process at the current cycle or only the first drive force limitation control is permitted by the process of step S410 at the previous cycle at the time of starting the process at the current cycle, the permitted state is changed to the prevented state.

According to the process illustrated in FIG. 4, when the detection level of the object is greater than the predetermined value Th1 and the object distance is smaller than the predetermined distance α, all the first drive force limitation control, the second drive force limitation control and the intervention brake control are permitted. Further, when the detection level of the object is greater than the predetermined value Th1 and the object distance is greater than or equal to the predetermined distance α, only the first drive force limitation control is permitted. Further, if the object is not detected or the detection level of the object is less than or equal to the predetermined value Th1, all the first drive force limitation control, the second drive force limitation control and the intervention brake control are prevented.

According to the process illustrated in FIG. 4, appropriate drive support can be implemented even if the sensing distance of the clearance sonar 201b is enlarged such that it is greater than the predetermined distance α. Specifically, with respect to the object detected in the range that is away from the vehicle by the distance greater than or equal to the predetermined distance α, by permitting the first drive force limitation control when the detection level is greater than the predetermined value Th1, the drive support can be started earlier. Further, respect to the object detected in the range that is away from the vehicle by the distance smaller than the predetermined distance α, the second drive force limitation control and the intervention brake control are executable, the likelihood of the crash into the object can be reduced. Further, with respect to the object detected in the range that is away from the vehicle by the distance greater than the predetermined distance α, the second drive force limitation control and the intervention brake control are not permitted even when the detection level is greater than the predetermined value Th1, and the passage of the negotiable narrow road such as the road between the inclined walls P2 (see FIG. (C)) is not interfered with (this is described hereinafter in detail with reference to FIG. 5).

Figure 5:
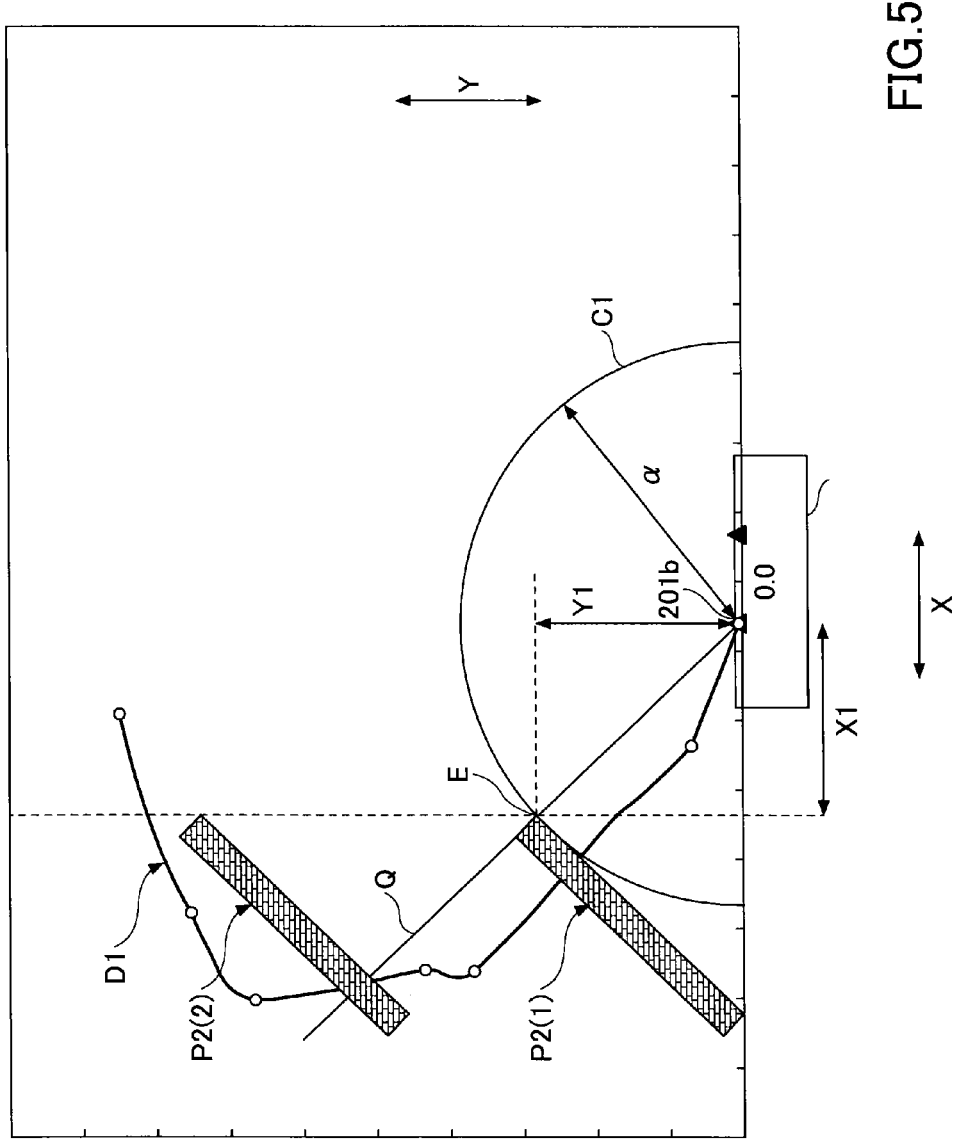
FIG. 5 is a diagram for illustrating an example of a way of setting a predetermined distance α.

FIG. 5 is a diagram for illustrating an example of a way of setting the predetermined distance α. In FIG. 5, a scene (road circumstance) in which two inclined walls P2(1) and P2(2) exist on the left side of the host vehicle such that the inclined walls P2(1) and P2(2) are arranged side by side in the back-and-forth direction. It is noted that the inclined walls P2 may exist symmetrically on the right side of the host vehicle. The clearance sonar 201b on the left side is described hereinafter; however, it holds true for the clearance sonar 201a on the right side. In FIG. 5, the end E (on the far side) of the inclined wall P2(1) on the near side is located at (X1[m], Y1[m]) in a coordinate system in which a center of a front portion of the host vehicle in the lateral direction is an original point, the lateral direction of the vehicle is an X direction, and the longitudinal direction the vehicle is a Y direction. As an example, the inclined walls P2(1) and P2(2) are inclined at an angle of 45 degrees. A circle C1 is a part of a circle with a radius of the predetermined distance α that corresponds to $\sqrt{(X1^2+Y1^2)}$.

In general, the reflected wave that is reflected in a direction perpendicular to the inclined walls P2 is received with high sensitivity by the clearance sonar 201b. In other words, the direction in which the sound wave is mainly reflected is perpendicular to the inclined walls P2. In FIG. 5, a line that extends from the clearance sonar 201b in a direction perpendicular to the inclined walls P2 is indicated by a reference numeral Q. Thus, during a period when the line Q intersects with the inclined walls P2, the inclined walls P2 are detected by the clearance sonar 201b. When the vehicle travels in its forward direction from the position illustrated in FIG. 5 (in the upper direction in FIG. 5), and the line Q passes through the end E of the inclined wall P2(1) on the near side, the line Q does not intersect with the inclined wall P2(1) on the near side so that the inclined wall P2(1) is not detected by the clearance sonar 201b. Instead of this, the line Q starts to intersect with the inclined wall P2(2) on the far side, and thus the inclined wall P2(2) on the far side is started to be detected by the clearance sonar 201b. This means that the vehicle can pass on the side of the inclined wall P2(1) on the near side without the object distance being smaller than the predetermined distance α (and thus the second drive force limitation control and the intervention brake control are not executed). In other words, the point illustrated in FIG. 5 is a critical point where the inclined wall P2(1) on the near side becomes in a non-detected state when the vehicle further travels in its forward direction therefrom. Thus, the point illustrated in FIG. 5 is a point where the object distance related to the inclined wall P2(1) on the near side becomes minimum (predetermined distance α). Similarly, the vehicle can pass on the side of the inclined wall P2(2) on the far side.

In this way, by setting the predetermined distance α according to the configuration (the inclination angle and the position of the end) of the negotiable inclined walls P, the passage by the inclined walls is possible without being interfered with by the second drive force limitation control and the intervention brake control. It is noted that, in the example illustrated in FIG. 5, it is assumed that the inclined walls have an ordinary inclination angle (45 degrees); however, if the inclination angle differs from 45 degrees, the predetermined distance α may be set accordingly. Further, with respect to the position (X1, Y1) of the end of the inclined wall P2(1), the predetermined distance α may be set based on a minimum value (or an average value) of a possible range of the negotiable distance between the inclined walls. For example, when the distance between the inclined walls is 3.4 m, (X1, Y1) is equal to (1.7, 1.4) and the predetermined distance α is nearly equal to 2. It is noted that a predetermined margin may be set for the predetermined distance α.

It is noted that, if there is a frontal wall in the frontal direction of the vehicle instead of the inclined wall P2(1) in the example illustrated in FIG. 5, the direction perpendicular to the frontal wall corresponds to the frontal direction (Y direction) of the clearance sonar 201b. In this case, even if the distance to the frontal wall becomes smaller than the predetermined distance α, the frontal wall still exists in the frontal direction of the clearance sonar 201b and thus the frontal wall is detected continuously by the clearance sonar 201b. Thus, in the case of the frontal wall, the second drive force limitation control and the intervention brake control are executable, and thus the likelihood of the crash into such a frontal wall can be reduced.

Figure 6:
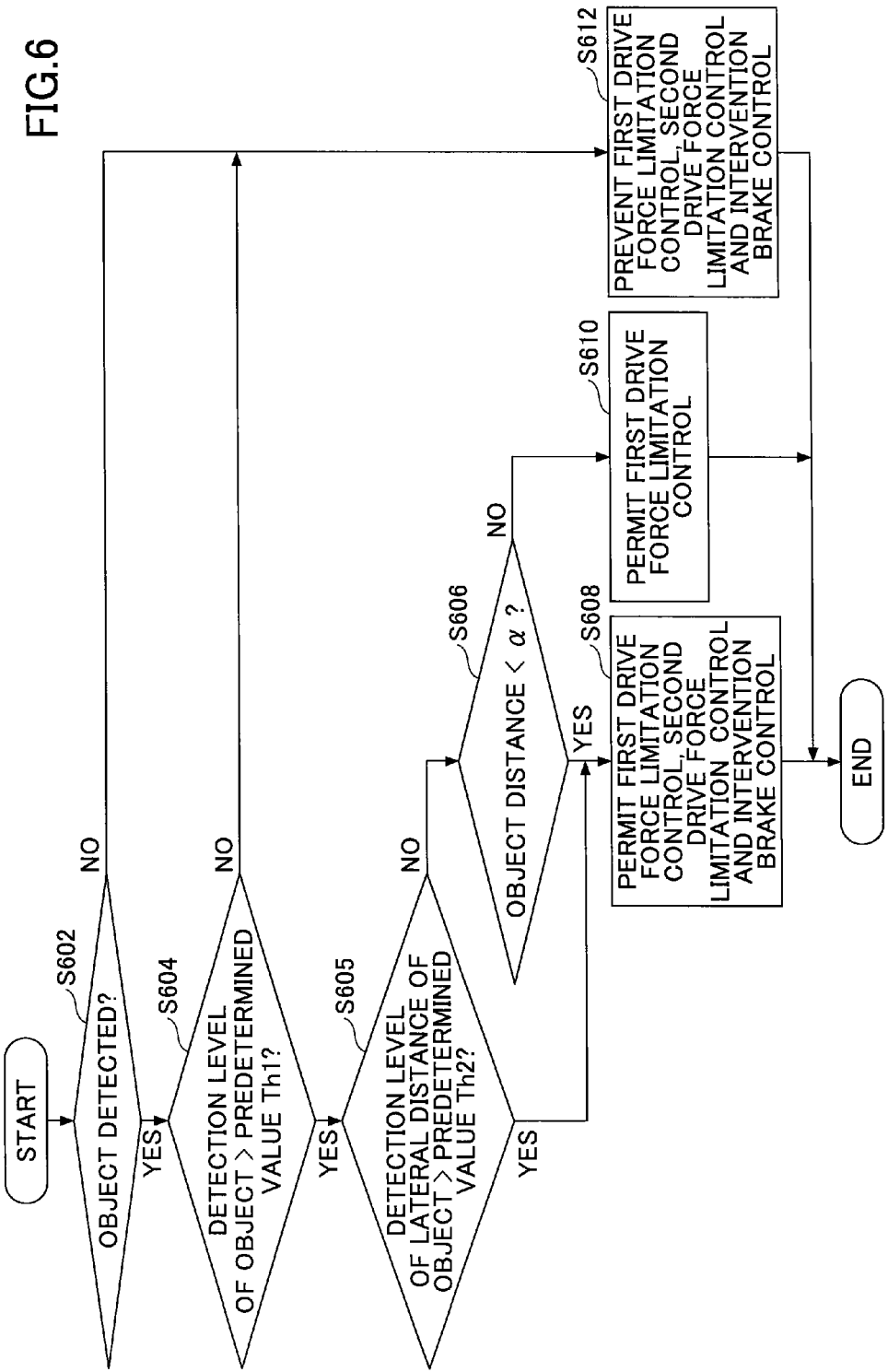
FIG. 6 is another example of a flowchart of a process executed by the drive support ECU 10.

FIG. 6 is another example of a flowchart of a process executed by the drive support ECU 10. The sensor abnormality detecting process illustrated in FIG. 6 differs from the process illustrated in FIG. 3 in that a process of step 605 is added. In the following, configurations related to the differences are mainly described.

The processes of step S602, S604 and S606 through S612 themselves may be the same as processes of step S402, S404 and S406 through S412 illustrated in FIG. 4, respectively. If the determination result in step S604 is affirmative, the process goes to step S605.

In step S605, the obstacle determination part 103 determines whether a detection level of the lateral distance of the object is greater than a predetermined value Th2. The predetermined value Th2 may correspond to a minimum value of a range of the detection level of the lateral distance in the case of the frontal obstacle (not negotiable therethrough), and the predetermined value Th2 may be adapted by experiments, simulations, etc. Alternatively, the detection level of the lateral distance may be an index value that represents a continuity of the detection of the lateral distance in time series. In other words, the index value may represent how successively the lateral distance is detected (calculated) in time series based on the information from the clearance sonars 201a and 201b. The index value may be an integrated value of a time during which the lateral distance is detected, for example. For example, if the lateral distance related to a certain object is detected for the first time at a certain cycle T0, and afterward the lateral distance related to the object is still detected in the five successive cycles at the current cycle T4, the index value may be 5T (T is a time of a single cycle). In this case, when the lateral distance related to the object is not detected temporally at a certain cycle, the index value may be reset to 0, or the time of cycles during which the object is not detected may be subtracted therefrom (see FIG. 8). Further, the index value may be the number of the cycles during which the lateral distance related to the same object is detected based on the information from the clearance sonars 201a and 201b. For example, if the lateral distance related to a certain object is detected for the first time at a certain cycle T0, and afterward lateral distance related to the object is still detected in the five successive cycles at the current cycle T4, the index value may be 5. Also in this case, when the lateral distance related to the object is not detected temporally at a certain cycle, the index value may be reset to 0, or the number of cycles during which the object is not detected may be subtracted therefrom. Further, in a simple example, the index value may be a binary value which indicates whether the lateral distance is detected successively at more than predetermined cycles.

In step 605, if the detection level of the lateral distance is greater than the predetermined value Th2, the process goes to step 608, and otherwise the process goes to step 606.

According to the process illustrated in FIG. 6, the following effects can be obtained in addition to the effects obtained by the process illustrated in FIG. 4. By considering the detection level of the lateral distance of the object, the second drive force limitation control and the intervention brake control can be permitted even for the object that is away from the vehicle by a distance greater than or equal to the predetermined distance α. With this arrangement, the second drive force limitation control and the intervention brake control can be started earlier for the frontal obstacle (even if the object is away from the vehicle by a distance greater than or equal to the predetermined distance α), if necessary.

Figure 7:
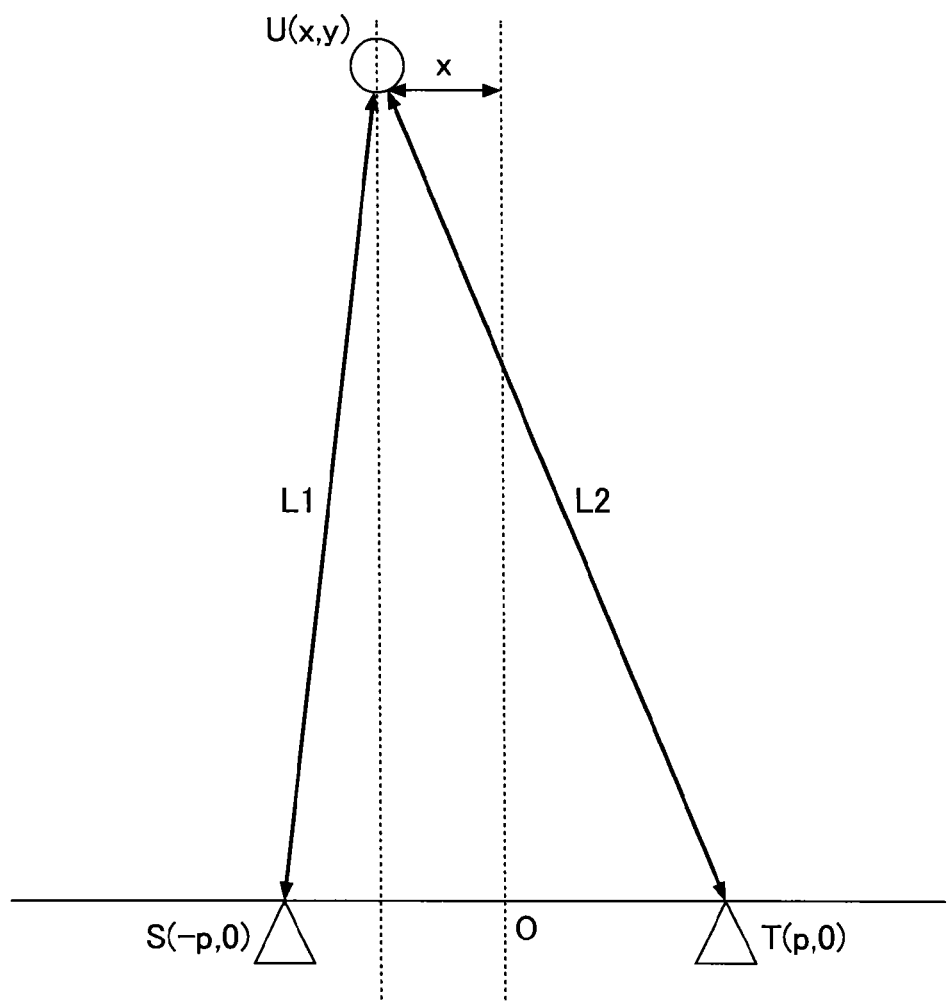
FIG. 7 is diagram for explaining a principle of a calculation of a lateral distance.

FIG. 7 is diagram for explaining a principle of a calculation of the lateral distance. In FIG. 7, the original point O corresponds to the center of the front portion of the vehicle in the lateral direction, S indicates the position of the clearance sonar 201b, T indicates the position of the clearance sonar 201a, and U indicates the position of the object (reflected point). As is the case with the foregoing, the clearance sonar 201b on the left side is described hereinafter; however, it holds true for the clearance sonar 201a on the right side.

When the clearance sonar 201b transmits the ultrasonic wave under a situation where the position of the object is within the overlapped area D3 of the detection areas D1 and D2 of the clearance sonars 201a and 201b, not only the clearance sonar 201b but also the clearance sonar 201a receive the reflected wave related to the ultrasonic wave transmitted by the clearance sonar 201b. At that time, with respect to the reflected wave received by the clearance sonar 201b, the following formula is given.

$$2L_1 = vt_{ss} \quad \text{formula (1)}$$

$L_1$ is the distance from the clearance sonar 201b to the object, v is a speed of sound, and $t_{SS}$ is a time (time-of-flight) from the time of the transmission of the ultrasonic wave at the clearance sonar 201b to the time of the reception of the reflected wave at the clearance sonar 201b.

Similarly, with respect to the reflected wave received by the clearance sonar 201a, the following formula is given.

$$L_1 + L_2 = vt_{ST} \quad \text{formula (2)}$$

$L_2$ is the distance from the clearance sonar 201a to the object, and $t_{ST}$ is a time from the time of the transmission of the ultrasonic wave at the clearance sonar 201b to the time of the reception of the reflected wave at the clearance sonar 201a. Further, the following formulas hold true due to a geometrical relationship.

$$(x+p)^2 + y^2 = L_1^2 \quad \text{formula (3)}$$

$$(x-p)^2 + y^2 = L_2^2 \quad \text{formula (4)}$$

p is a lateral distance (know value) between the clearance sonars 201a and 201b and the original point. From these four formulas, the lateral distance x of the object can be determined.

In this way, when the position of the object is within the overlapped area D3 of the detection areas D1 and D2 of the clearance sonars 201a and 201b, the lateral distance x of the object can be determined. Thus, the fact that the detection level of the lateral distance of the object is greater than the predetermined value Th2 means that the likelihood that the object is within the overlapped area D3 is high. According to the process illustrated in FIG. 6, the tendency is considered such that, with respect to the object within the overlapped area D3 (i.e., the object in the frontal direction), it is possible to start the second drive force limitation control and the intervention brake control earlier (even if the object is away from the vehicle by a distance greater than or equal to the predetermined distance α), if necessary.

It is noted that, in the description with reference to FIG. 7, the lateral distance x of the object is calculated using the reception result at the clearance sonar 201b of the reflected wave related to the ultrasonic wave transmitted therefrom, and the reception result at the clearance sonar 201a of the reflected wave related to the ultrasonic wave transmitted by the clearance sonar 201b; however, the lateral distance x of the object may be calculated by other ways. For example, the lateral distance x of the object may be calculated using the reception result at the clearance sonar 201b of the reflected wave related to the ultrasonic wave transmitted therefrom, and the reception result at the clearance sonar 201b of the reflected wave related to the ultrasonic wave transmitted by the clearance sonar 201a.

FIG. 8 is diagram for explaining an example of a way of calculating the detection level of the lateral distance of the object. In FIG. 8, (A) illustrates an example of the detection state of the lateral distance in time series, (B) illustrates an example of a timer value, and (C) illustrates an example of the detection level in time series.

In the example illustrated in FIG. 8, the timer value is incremented during a period in which the lateral distance is detected, and decremented during a period in which the lateral distance is not detected. Further, the timer value has a lower value (initial value 0) and a predetermined upper value. The detection level is determined according to the timer value. In the example illustrated in FIG. 8, the detection level is defined by four steps from 0 to three, and a hysteresis is given between a threshold for the increasing detection level and a threshold for the decreasing detection level. For example, the hysteresis may be set such that the threshold for the increasing detection level is greater than the threshold for the decreasing detection level, as illustrated in FIG. 8.

In the example illustrated in FIG. 8, a certain object is detected for the first time at time t0. The detected state of the object is kept until time 3. Accordingly, the timer value continues to increase from the initial value 0 at time 0 until time 3. During this time period, the timer value exceeds a threshold for increasing the detection level from 0 to 1 at time t1, and thus the detection level becomes 1. Further, after that, the timer value exceeds a threshold for increasing the detection level from 1 to 2 at time t2, and thus the detection level becomes 2. The non-detected state of the object is kept from time t3 to time t5. Accordingly, the timer value decreases gradually. During this time period, the timer value becomes smaller than a threshold for decreasing the detection level from 2 to 1 at time t4, and thus the detection level becomes 1. At time t5, the same object is detected again. The detected state of the object is kept until time t8. Accordingly, the timer value starts to increase again from time t5. The timer value reaches the upper limit value after time t7, and is kept at the upper limit value (a section during which the timer value is the upper limit value is indicated by a reference M. During this time period, the timer value exceeds a threshold for increasing the detection level from 1 to 2 at time t6, and thus the detection level becomes 2. Further, after that, the timer value exceeds a threshold for increasing the detection level from 2 to 3 at time t7, and thus the detection level becomes 3 (maximum value). The non-detected state of the object is kept from time t8 over t10. Accordingly, the timer value decreases gradually. During this time period, the timer value becomes smaller than a threshold for decreasing the detection level from 3 to 2 at time t9, and thus the detection level becomes 2. Further, after that, the timer value becomes smaller than a threshold for decreasing the detection level from 2 to 1 at time t10, and thus the detection level becomes 1.

It is noted that, in the case where the calculation way of the detection level of the lateral distance of the object illustrated in FIG. 8 is used, the threshold value Th2 in step S605 in FIG. 6 may correspond to the level "1" or "2", for example. Alternatively, the determination of step S605 in FIG. 6 may be omitted (only the calculation of the detection level of the lateral distance is performed), and the predetermined distance α may be varied according to the detection level of the lateral distance. In this case, the predetermined distance α may be varied such that the predetermined distance α becomes greater as the detection level of the lateral distance becomes greater.

It is noted that, in the example illustrated in FIG. 6 through FIG. 8, the detection level of the lateral distance of the object is calculated without considering the value of the lateral distance itself; however, the value of the lateral distance may be considered. For example, the detection level of the lateral distance of the object may be such an index value that increases if the lateral distance less than or equal to a predetermined distance is detected. In this case, the predetermined distance may correspond to a half of the width of the vehicle, and a predetermined margin may be given. Such an arrangement is suited for a case where the lateral width of the overlapped area D3 is substantially greater than the width of the vehicle, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, the foregoing is mainly related to the left and right clearance sonars 201a and 201b for the forward object detection; however, the foregoing can be applied to the clearance sonars 201c and 201d as well.

Further, according to the embodiment described above, both the second drive force limitation control and the intervention brake control are executed; however, only one of the second drive force limitation control and the intervention brake control may be executed.

Further, according to the embodiment described above, the predetermined distance α is common to the second drive force limitation control and the intervention brake control; however, different values may be used for the second drive force limitation control and the intervention brake control, respectively. For example, with respect to step S406 and step S408 (or step S606 and step S608), the second drive force limitation control may be permitted when the object distance is smaller than a predetermined value β (not equal to α), while the intervention brake control may be permitted when the object distance is smaller than a predetermined value α.

Further, according to the processes illustrated in FIG. 4 and FIG. 6, as a preferable embodiment, the detection level of the object is considered (see step S404 and step S604); however, the detection level of the object may not be considered. In other words, in the processes illustrated in FIG. 4 and FIG. 6, the processes of step S404 and step S604 may be omitted, respectively.

Further, according to the process illustrated in FIG. 4 or FIG. 6, if the determination result of step S404 or step S604 is negative, all of the first drive force limitation control, the second drive force limitation control and the intervention brake control are prevented as is the case where the determination result of step S402 or step S602 is negative; however, a drive force limitation control whose limitation level is lower than the first drive force limitation control may be permitted when the determination result of step S404 or step S604 is negative.

Further, as a preferable embodiment, the processes illustrated in FIG. 4 and FIG. 6 are performed in the low-speed range that is lower than or equal to the predetermined vehicle speed and greater than 0; however, the processes illustrated in FIG. 4 and FIG. 6 may be performed in a middle-speed range, etc.

Further, in the process illustrated in FIG. 6, the detection level of the object (step S604) and the detection level of the lateral distance of the object (step S605) are evaluated separately; however, they may be evaluated collectively. For example, the predetermined distance α may be varied according to an index value that corresponds to a combination of these detection levels (simply summed value of these levels, for example).

The present application is based on Japanese Priority Application No. 2013-220190, filed on Oct. 23, 2013, the entire contents of which are hereby incorporated by reference.

What is claimed is:

1. A drive support apparatus, comprising:
a sonar sensor that transmits an ultrasonic wave to an object outside of a vehicle to obtain, based on a reflected wave thereof, object information related to a distance to the object;
a controller that permits a first drive force limitation control when the distance to the object, determined based upon the object information obtained by the sonar sensor, is longer than or equal to a predetermined distance, and permits at least one of a second drive force limitation control and an intervention brake control when the distance to the object, determined based upon the object information obtained by the sonar sensor, is shorter than the predetermined distance, wherein a limitation level in the second drive force limitation control is higher than that in the first drive force limitation control, the first drive force limitation control includes setting a predetermined upper limit for a drive force demand calculated according to an accelerator operation by a user, and the second drive force limitation control includes fully closing a throttle valve according to the distance to the object and a vehicle speed of a host vehicle.

2. The drive support apparatus of claim 1, wherein the predetermined distance is set according to a width between side walls that exist on opposite sides of a negotiable road.

3. The drive support apparatus of claim 1, further comprising another sonar sensor, wherein the controller obtains lateral distance information related to a lateral distance of the object with respect to a traveling direction of the host vehicle based on the object information from the sonar sensors, and the controller permits at least one of the second drive force limitation control and the intervention brake control when the distance to the object is greater than or equal to the predetermined distance in a case where a first index value, which represents how successively the lateral distance information is obtained in time series, is greater than or equal to a predetermined first reference value.

4. The drive support apparatus of claim 1, wherein the controller permits at least one of the first drive force limitation control, the second drive force limitation control and the intervention brake control only when a second index value, which represents how successively the object is detected based on the object information in time series, is greater than or equal to a predetermined second reference value.

5. The drive support apparatus of claim 1, wherein the controller permits at least one of the first drive force limitation control, the second drive force limitation control and the intervention brake control only when the vehicle speed of the host vehicle is lower than a predetermined vehicle speed.

* * * * *